(12) United States Patent
Aoki et al.

(10) Patent No.: US 7,519,052 B2
(45) Date of Patent: Apr. 14, 2009

(54) APPARATUS AND METHOD TO PROVIDE CURRENT LOCATION INFORMATION SERVICES IN A NETWORK

(75) Inventors: Norihiro Edwin Aoki, Sunnyvale, CA (US); Michaela Ann Beeby Barnes, Bethesda, MD (US)

(73) Assignee: AOL LLC, Dulles, VA (US)

(*) Notice: Subject to any disclaimer, the term of this patent is extended or adjusted under 35 U.S.C. 154(b) by 45 days.

(21) Appl. No.: 11/365,377

(22) Filed: Feb. 28, 2006

(65) Prior Publication Data

US 2006/0203811 A1  Sep. 14, 2006

Related U.S. Application Data

(63) Continuation of application No. 10/816,472, filed on Mar. 31, 2004, now Pat. No. 7,024,192.

(60) Provisional application No. 60/459,509, filed on Mar. 31, 2003.

(51) Int. Cl.
*H04L 12/66* (2006.01)

(52) U.S. Cl. .................. 370/356; 370/486; 455/456.1; 455/456.2

(58) Field of Classification Search ................ 370/356, 370/486; 455/456.1–2, 414.1–3, 433, 435.1
See application file for complete search history.

(56) References Cited

U.S. PATENT DOCUMENTS

| | | | |
|---|---|---|---|
| 5,440,541 A | 8/1995 | Iida et al. | |
| 5,963,866 A | 10/1999 | Palamara et al. | |
| 6,442,391 B1 | 8/2002 | Johansson et al. | |
| 6,763,017 B1 * | 7/2004 | Buckingham et al. | 370/352 |
| 7,245,630 B1 * | 7/2007 | Chen et al. | 370/458 |
| 7,293,271 B2 * | 11/2007 | Trossen et al. | 719/318 |
| 2002/0025814 A1 | 2/2002 | Murai | |
| 2002/0094777 A1 | 7/2002 | Cannon et al. | |
| 2003/0078987 A1 * | 4/2003 | Serebrennikov | 709/217 |
| 2003/0148771 A1 | 8/2003 | deVerteuil | |
| 2004/0193707 A1 | 9/2004 | Alam | |
| 2004/0203768 A1 * | 10/2004 | Ylitalo et al. | 455/435.1 |

OTHER PUBLICATIONS

"MapPoint Location Server Overview." http://msdn.microsoft.com/library/default.asp.
"Microsoft MapPoint Location Server." http://msdn.microsoft.com/library/default.asp.
Evers, J. "Microsoft to Tell What's New with Windows." Apr. 30, 2004. *PC World*.
Lemon, S. "Intel Chips to Support Location-Based Services." Jun. 1, 2004. *Computerworld*.
Milroy, S. "Learning About Location-Based Services Technology." Feb. 2003. *WindowsITPro*.
Sliwa, C. "Microsoft Metadirectory Services Gets New Identity." Jul. 7, 2003. *Computerworld*.

* cited by examiner

*Primary Examiner*—CongVan Tran
(74) *Attorney, Agent, or Firm*—Michael A. Glenn; Glenn Patent Group (57) ABSTRACT

An apparatus and method that provides current location information services in a network are described. In one preferred embodiment, a location identifier and a user identifier are received from a user. A user profile associated with the user identifier is retrieved from a database of user profiles. The user profile includes one or more stored location identifiers associated with the user. The received location identifier is then compared to the stored location identifiers to determine matching location identifiers and further to determine current location information of the user.

32 Claims, 7 Drawing Sheets

APPARATUS AND METHOD TO PROVIDE CURRENT LOCATION INFORMATION SERVICES IN A NETWORK

CROSS-REFERENCE TO RELATED APPLICATIONS

The present application is a Continuation Application of, and claims priority to, U.S. application Ser. No. 10/816,472, filed on 31 Mar. 2004 now U.S. Pat. No. 7,024,192and entitled Apparatus and Method to Provide Current Location Information Services in a Network, which claims the benefit of priority to U.S. Provisional Patent Application Ser. No. 60/459,509, filed on 31 Mar. 2003 and entitled Method For Providing Location Services For Sip-Based Devices, which are each incorporated herein in their entirety by this reference thereto.

TECHNICAL FIELD

The invention relates generally to the field of network-based communications. More particularly, to an apparatus and method that provides current location information services in a network, such as the Internet.

BACKGROUND OF THE INVENTION

Until recently there has persisted a fundamental dichotomy between two main types of telecommunications networks. The first type of telecommunications network, i.e. the telephone network, switches and transports predominantly voice, facsimile, and modulation-demodulation system (modem) traffic. The Public Switched Telephone Network (PSTN) is an example of this type of network. The second type of telecommunications network, i.e. the data network, switches or routes and transports data and video between computers. The Internet is an example of a public data network.

The explosive growth of the Internet as a publication and interactive communication platform has created an electronic environment that is changing the way business is transacted. As the Internet becomes increasingly accessible around the world, voice communications established over the Internet increase exponentially.

Several attempts have been made to facilitate such network-based communications and to provide low cost, flexible solutions. For example, some attempts involve the development and subsequent deployment of Voice over Internet Protocol (VoIP)-based and Session Initiation Protocol (SIP)-based communications systems. VoIP technology enables real-time transmission of voice signals as packetized data over IP networks that employ specific protocols, such as, for example, Transmission Control Protocol (TCP), Real-Time Transport Protocol (RTP), User Datagram Protocol (UDP), and Internet Protocol (IP) suite. SIP technology involves a signaling protocol for Internet conferencing, telephony, instant messaging and other communications. The protocol initiates call setup, routing, authentication, and other feature messages to endpoints within an IP domain. Because Internet-based communications are not fixed to a particular location, these systems provide users with great flexibility as to location and mode of use of such services.

However, one of the major limitations of the current Internet-based communications relates to the inability of such protocols to convey an accurate location of the users. As a result, emergency communications may not be accurately traced and users may be put at risk. In contrast to a regular PSTN, for example, where an area code and a prefix hierarchically specify the location of the calling party, a VoIP user connects to the Internet using a SIP-based communications device capable of supporting VoIP, such as a VoIP telephone, which is identified within the network by an IP address. The IP address is usually assigned by an Internet Service Provider (ISP) and consists of a unique series of numbers. The user of the SIP-based device is identified by a contact address of record (AoR), which is used as part of the SIP protocol to identify both the sending and receiving users of a communication. Because the sending user can use the same AoR to communicate from different locations within the network, the current physical location cannot be ascertained with specificity. Thus, what is needed is a mechanism to provide current location information services to users of VoIP and SIP-based communications technologies.

SUMMARY OF THE INVENTION

An apparatus and method that provides current location information services in a network are described. In one preferred embodiment, a location identifier and a user identifier are received from a user. A user profile associated with the user identifier is retrieved from a database of user profiles. The user profile includes one or more stored location identifiers associated with the user. The received location identifier is then compared to the stored location identifiers to determine matching location identifiers and further to determine current location information of the user.

DETAILED DESCRIPTION

Figure 1:
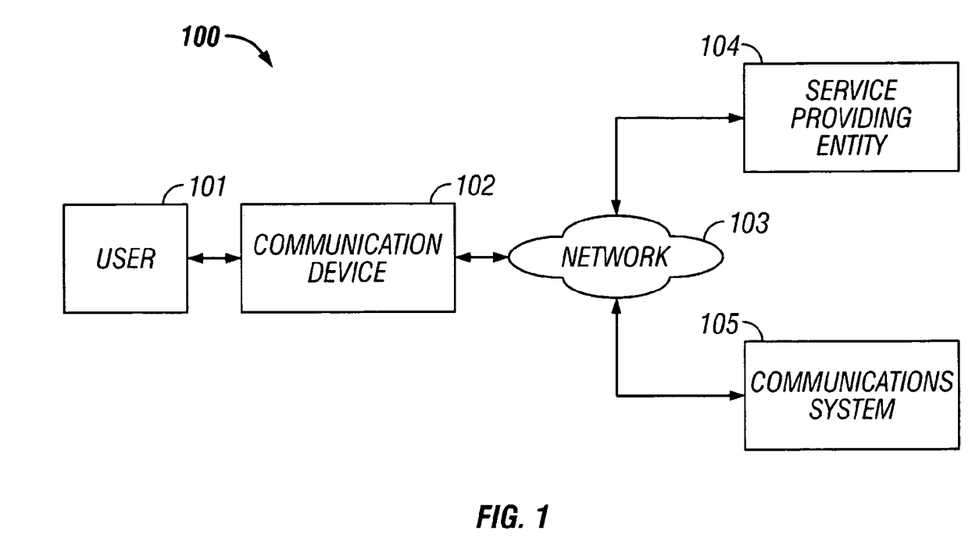
FIG. 1 is a block diagram illustrating a communications network architecture according to an exemplary embodiment of the invention.

FIG. 1 is a block diagram illustrating a communications network architecture 100, according to an exemplary embodiment of the invention. As illustrated in FIG. 1, the communications network architecture 100 includes a service providing entity 104 and a communications system 105 connected via a network 103, such as, for example, the Internet.

Multiple users, such as the exemplary user 101 shown, connect to the network 103 through a corresponding network communications device 102 and may access the service providing entity 104 and the communications system 105 through the network 103. Other examples of Voice Packet network systems (VOPS) that a user 101 may use to access the service providing entity 104 and the communications system 105 include Voice over Frame Relay network systems, Voice over Asynchronous Transfer Mode (ATM) network systems, and Voice over High-Level Data Link Control (HLDC) network systems, or other known network systems. Although the embodiments presented below are described in detail in connection with a Voice over Internet Protocol (VoIP) and Session Initiation Protocol (SIP) network system, it is to be understood that other network systems may be used with the invention.

In one embodiment, the network communications device 102 is a SiP-based device capable of supporting VoIP, such as, for example, a VoIP telephone, a SiP telephone, an Internet telephone, which is identified in the network 103 by a location identifier, such as, for example, an Internet Protocol (IP) address. Alternatively, the device 102 is a SIP-based adapter that is coupled to a standard hard-wired telephone, such as, for example, an Analog Telephone Adapter (ATA) device. The user 101 of such a SIP-based device 102 is identified within the network 103 by a SIP Contact Address of Record (AoR), which is an electronic address unique to the user 101. SIP AoRs are used as part of the protocol to identify both the sender user and the receiver user of a SIP communication.

In one embodiment, the service providing entity 104 is an Internet Service Provider (ISP), which provides access to the network 103 and assigns IP addresses to the users, allowing data to be routed to such users. In an alternate embodiment, the service providing entity 104 may physically reside within the communications system 105, which is described in further detail below in connection with FIGS. 2-4.

Figure 2:
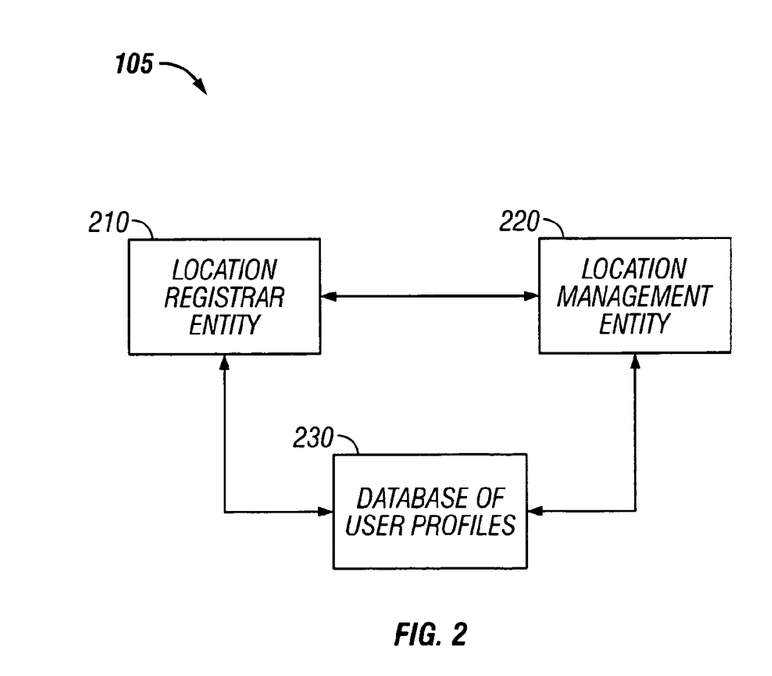
FIG. 2 is a block diagram illustrating a communications system to provide current location information services in the network according to an exemplary embodiment of the invention.

FIG. 2 is a block diagram illustrating a communications system 105 to provide current location information services in the network 103 according to an exemplary embodiment of the invention. As illustrated in FIG. 2, in one embodiment, the communications system 105 includes a location registrar entity 210 coupled to a location management entity 220. Although the location registrar entity 210 and the location management entity 220 are illustrated as separate logical and physical entities, it is to be understood that both may physically reside within the same entity and may perform operations, as described in further detail below.

The location registrar entity 210 is a hardware and/or software module, such as, for example, a network server, configured to receive a user identifier from the user 101, such as, for example, the user's contact address of record (AoR), and to maintain a binding between the user's AoR and the network communications device 102, as specified by the location identifier of the device 102. The location management entity 220 is a hardware and/or software module, such as, for example, a network server, configured to perform operations as described in further detail below.

A database of user profiles 230 is coupled to the location registrar entity 210 and to the location management entity 220. The database 230 stores a user profile for each user 101, the user profile including the user identifier, one or more location identifiers associated with the network communications device 102, and specific location information associated with each location identifier, such as, for example, the physical address where the user 101 is located when connecting to the network 103 via the communications device 102. In one embodiment, the database 230 may be implemented as a relational database, and may include a number of tables having entries, or records, that are linked by indices and keys. In an alternate embodiment, the database 230 may be implemented as a collection of objects in an object-oriented database.

Figure 3:
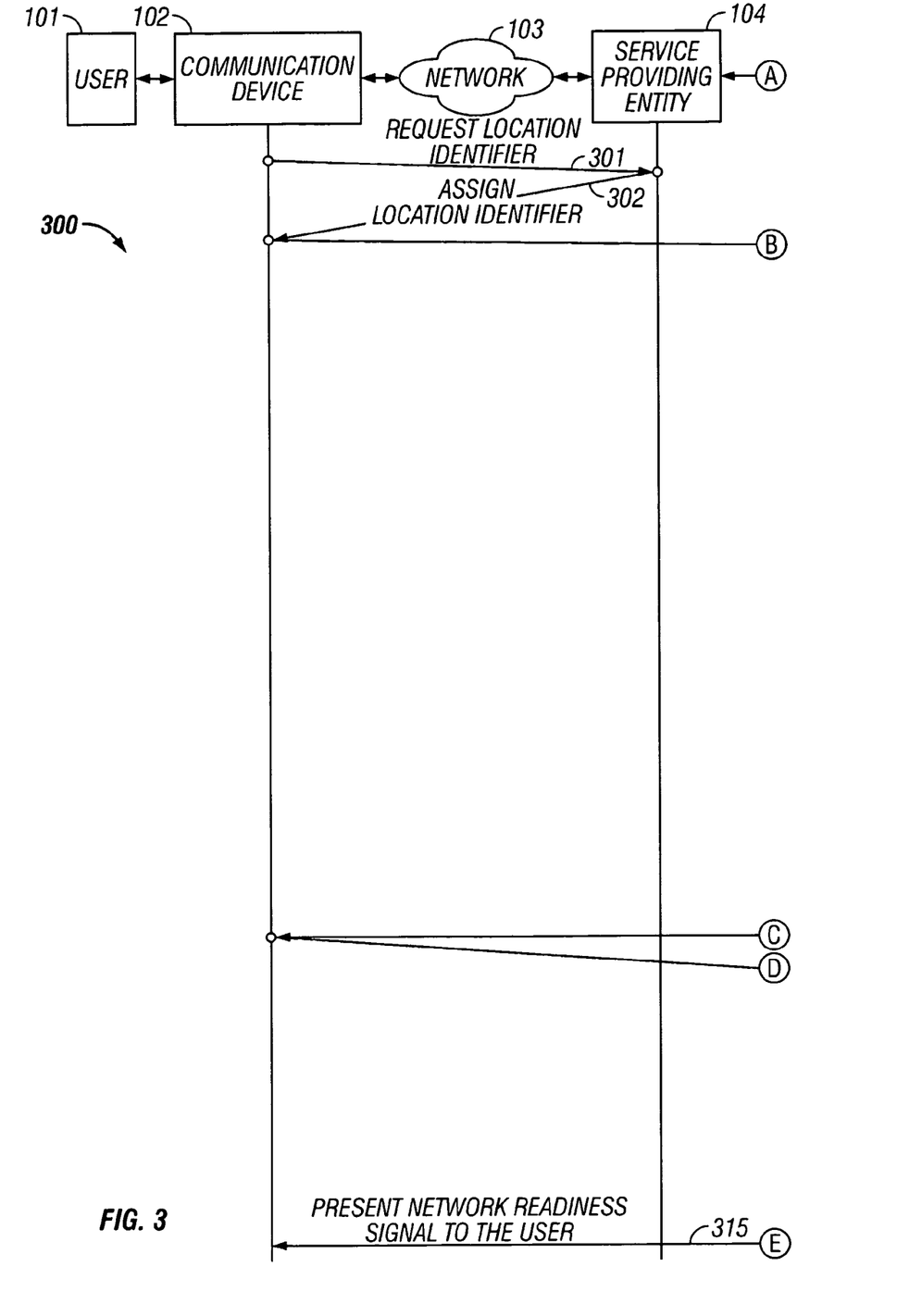
FIG. 3 is an interaction diagram illustrating a sequence of interactions to provide current location information services in the network according to an exemplary embodiment of the invention.

FIG. 3 is an interaction diagram illustrating a sequence of interactions to provide current location information services in the network according to an exemplary embodiment of the invention. While the sequence 300 describes a client-server environment, whereby communications between users, such as exemplary user 101, are facilitated by, or performed through, the network 103, it will also be appreciated that the teachings of the invention may be applied to a peer-to-peer environment, whereby the users communicate directly and not through the network 103, or may be applied to a client-server environment functioning over another real-time communications network.

As illustrated in FIG. 3, in one embodiment, the sequence 300 commences at block 301 with a request by the user 101 for a location identifier to be assigned to the communications device 102. The user 101 connects the device 102, such as, for example, the VoIP telephone, to the network 103 through a hard-wired connection, such as, for example, an Ethernet jack, or through a wireless connection, and requests the location identifier from the service providing entity 104.

At block 302, the service providing entity 104, such as, for example, the ISP, assigns the location identifier, e.g. IP address, and transmits the location identifier to the device 102, thereby allowing data to be routed to the user 101 via the communications device 102. In one embodiment, the sequence 300 continues at block 303 with the transmission of the location identifier and the user identifier, e.g. contact AoR, to the location registrar entity 210 within the communications system 105. In one embodiment, the user 101 communicates with the location registrar entity 210 via communications device 102 and one or more network proxies, such as, for example, SIP proxies configured to route calls within the network 103.

In an alternate embodiment, the communications device 102 may detect a change in position and, implicitly, in the location of the user 101, and may transmit the user identifier, the location identifier, and a change signal to the location registrar entity 210 to communicate the change in position. For example, in one embodiment, the device 102 stores the previous location identifier, such as the IP address, and upon connecting to the network 103, detects a change in the location identifier. Alternatively, the device 102 may detect a change in time zone from the previous location of the user 101. In another alternate embodiment, the device 102 may use a location determining technique, such as, for example, Global Positioning System (GPS) technology, to detect the change in the location of the user 101. In yet another alternate embodiment, the device 102 may detect a change in its internal parameters, such as, for example, a detection of a loss of power, or a detection of a movement indicator, such as a mercury indicator.

In another alternate embodiment, upon connection of the communication device 102 to the network 103, the location registrar entity 210 may detect a change in the location of the device 102. For example, the location registrar entity 210 may use location determining techniques (e.g., GPS) or may detect a network layout modification in order to detect the change in location of the device 102. Subsequently, the location registrar entity 210 may receive the location identifier and the user identifier from the device 102 and may proceed with the processing blocks described in detail below.

At block 304, the location registrar entity 210 accesses the database 230 and retrieves a user profile associated with the received user identifier. At block 305, the location management entity 220 accesses the user profile and compares the location identifier received from the user 101 to the stored location identifiers. Initially, in one embodiment, the location management entity 220 compares the location identifier received from user 101 to the last stored location identifier. Alternatively, the location management entity 220 may use other known algorithms to perform the comparison operation.

At block 306, the location management entity 220 makes a decision whether the location identifier received from the user 101 is identical to the last stored location identifier. In one embodiment, if the two location identifiers are identical, the sequence 300 jumps to block 315, where the location registrar entity 210 presents a network readiness signal to the user 101 via the network communication device 102. Alternatively, the service providing entity 104 may present the network readiness signal to the user 101. In yet another alternate embodiment, a network routing entity (not shown) may present the network readiness signal to the user 101. Otherwise, if the two location identifiers are not identical, the location management entity 220 performs subsequent comparison operations between the location identifier and each of the other stored location identifiers.

In one embodiment, at block 307, the location management entity 220 makes a further decision whether the location identifier received from the user 101 matches any of the stored location identifiers. If there is a match, at block 308, the location registrar entity 210 updates the location information associated with the matched location identifier stored in the user profile and designates it as current location information in the database 230. Subsequently, the sequence 300 jumps to block 315, where the location registrar entity 210 presents a network readiness signal to the user 101 via the network communication device 102. Alternatively, the service providing entity 104 may present the network readiness signal to the user 101. In yet another alternate embodiment, a network routing entity (not shown) may present the network readiness signal to the user 101.

Otherwise, if the location identifier received from the user 101 does not match any of the stored location identifiers, at block 309, the location management entity 220 determines the location information of the user 101. The location management entity 220 performs determination operations to ascertain the location of the user 101 and communicates the location information to the location registrar entity 210, as described in further detail below.

In one embodiment, the location management entity 220 analyzes specific criteria, such as, for example, but not limited to, the capability and need to connect to the user 101, or the availability of location determining techniques, and makes a decision at block 310 whether to contact the user 101 via the communications device 102 to request location information directly from the user 101.

If there is a need to contact the user 101, at block 311, the location management entity 220 requests location information from the user 101. In one embodiment, the location management entity 220 communicates with the device 102 via a voice channel and directs the user 101 to a network operator to provide the location information, such as, for example, the current physical address where the user 101 is located. Alternatively, the location management entity 220 may direct the user 101 to speak or key in the physical address of the device 102 and may use known speech recognition techniques to extract the location information. In another alternate embodiment, the location management entity 220 may communicate with the user 101 electronically through the communications device 102.

At block 312, the user 101 transmits the location information via the communications device 102. In one embodiment, the user 101 communicates the location information verbally to a live network operator or to a recorded message. Alternatively, the user 101 may electronically input the location information through the pad of the communications device 102, for example.

If the location management entity 220 decides not to contact the user 101, at block 313, the location management entity 220 uses known locating techniques to independently determine the location of the device 102 and, consequently, of the user 101. In one embodiment, the location management entity 220 connects to a gateway device (not shown) having knowledge of the user 101 and extracts the location information from the gateway device. Alternatively, the location management entity 220 may use a known Global Positioning System (GPS) to locate the device 102 and to retrieve the location information of the user 101. In another alternate embodiment, the location management entity 220 may use any of a number of known location determining techniques to determine the location information associated with the user 101 and the device 102.

Subsequently, at block 314, the location registrar entity 210 accesses the location information and stores it with the location identifier and the user identifier received from the user 101 and designates it as current location information. Finally, at block 315, the location registrar entity 210 presents a network readiness signal to the user 101 via the network communication device 102. In one embodiment, the location registrar entity 210 transmits a simulated dial tone to the device 102 via the established network proxies. Alternatively, the location registrar entity 210 may supply another type of known indicator to the user 101 to indicate availability of the network 103 and the system 105 to route communications from the user 101. In an alternate embodiment, the service providing entity 104 may present the network readiness signal to the user 101. In yet another alternate embodiment, a network routing entity (not shown) may present the network readiness signal to the user 101.

In one embodiment, subsequent to the receipt of the network readiness signal, the user 101 transmits a destination user identifier associated to a destination user (not shown) to a network routing entity (not shown). The network routing entity may reside at a separate physical location or may physically reside within the same entity as the location registrar entity 210 and the location management entity 220. Subsequently, the network routing entity receives the destination user identifier and further establishes a communication between the user 101 and the destination user using the destination user identifier.

Figure 4:
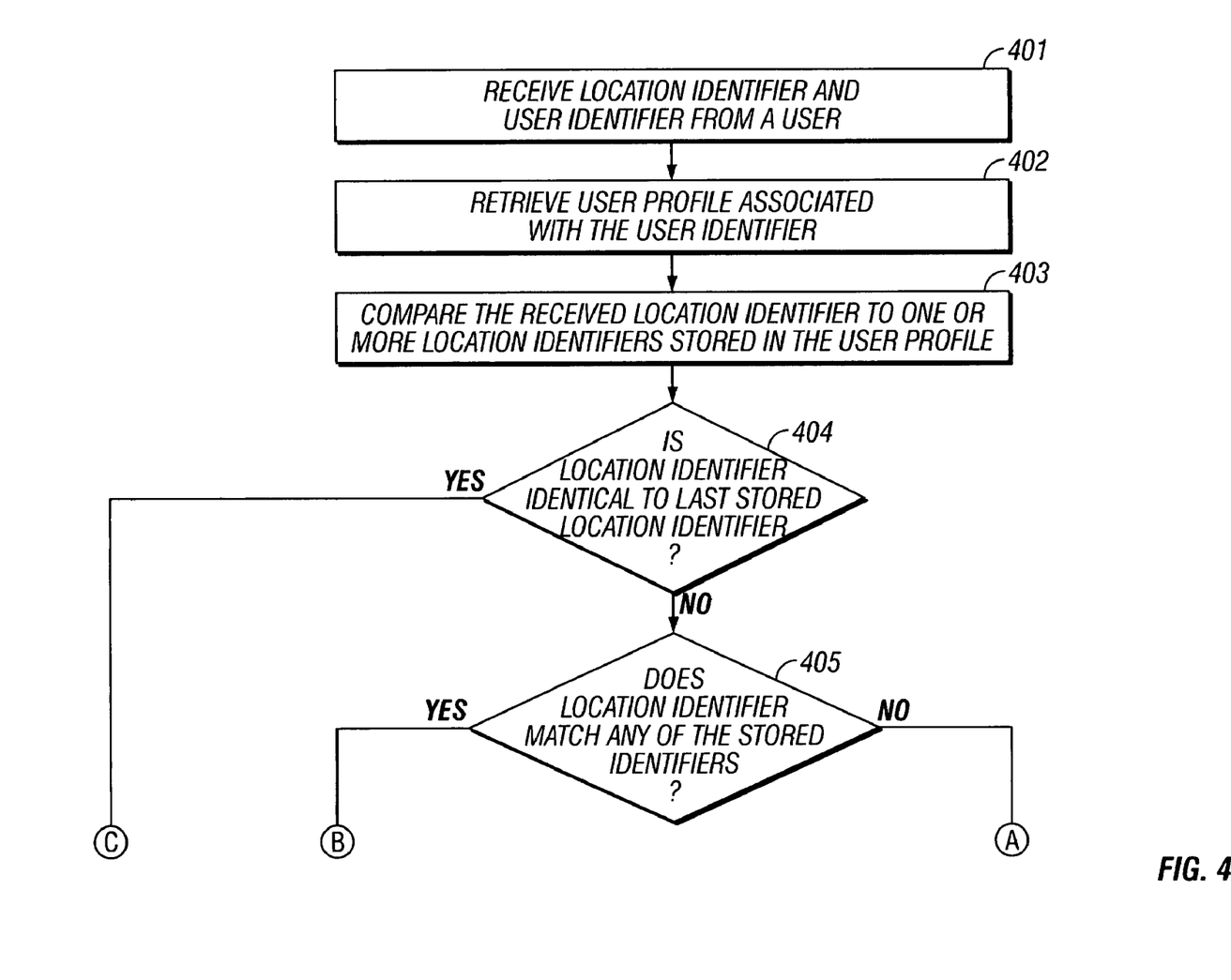
FIG. 4 is a flow chart illustrating a method to provide current location information services in the network according to an exemplary embodiment of the invention.

FIG. 4 is a flow chart illustrating a method to provide current location information services in the network, according to an exemplary embodiment of the invention. As illustrated in FIG. 4, at processing block 401, a location identifier and a user identifier are received from a user.

At processing block 402, a user profile associated with the received user identifier is retrieved. At processing block 403, the received location identifier is compared to one or more location identifiers stored within the user profile.

At processing block 404 a decision is made whether the location identifier is identical to the last stored location identifier associated with the user. If the location identifier matches the last location identifier stored in the user profile, then the procedure jumps to the processing block 413. Otherwise, if the location identifier does not match the last stored location identifier, at processing block 405, another decision is made whether the location identifier matches any of the other stored location identifiers.

If the location identifier matches any of the stored location identifiers, at processing block 406, the location information associated with the matched location identifier is updated and designated as current location information. Otherwise, if the location identifier fails to match any of the stored location identifiers, at processing block 407, location information associated with the user is determined.

At processing block 408, a decision is made whether there is a need to contact the user to ascertain the location information. If a decision is made to contact the user, at processing block 409, location information is requested from the user. Next, at processing block 410, location information is received from the user. If a decision is made not to contact the user, at processing block 411, known locating techniques are used to determine the location information associated with the user.

Subsequently, at processing block 412, the location information is stored with the location identifier and the user identifier in the user profile and is designated as current location information. Finally, at processing block 413, a network readiness signal is presented to the user.

Figure 5:
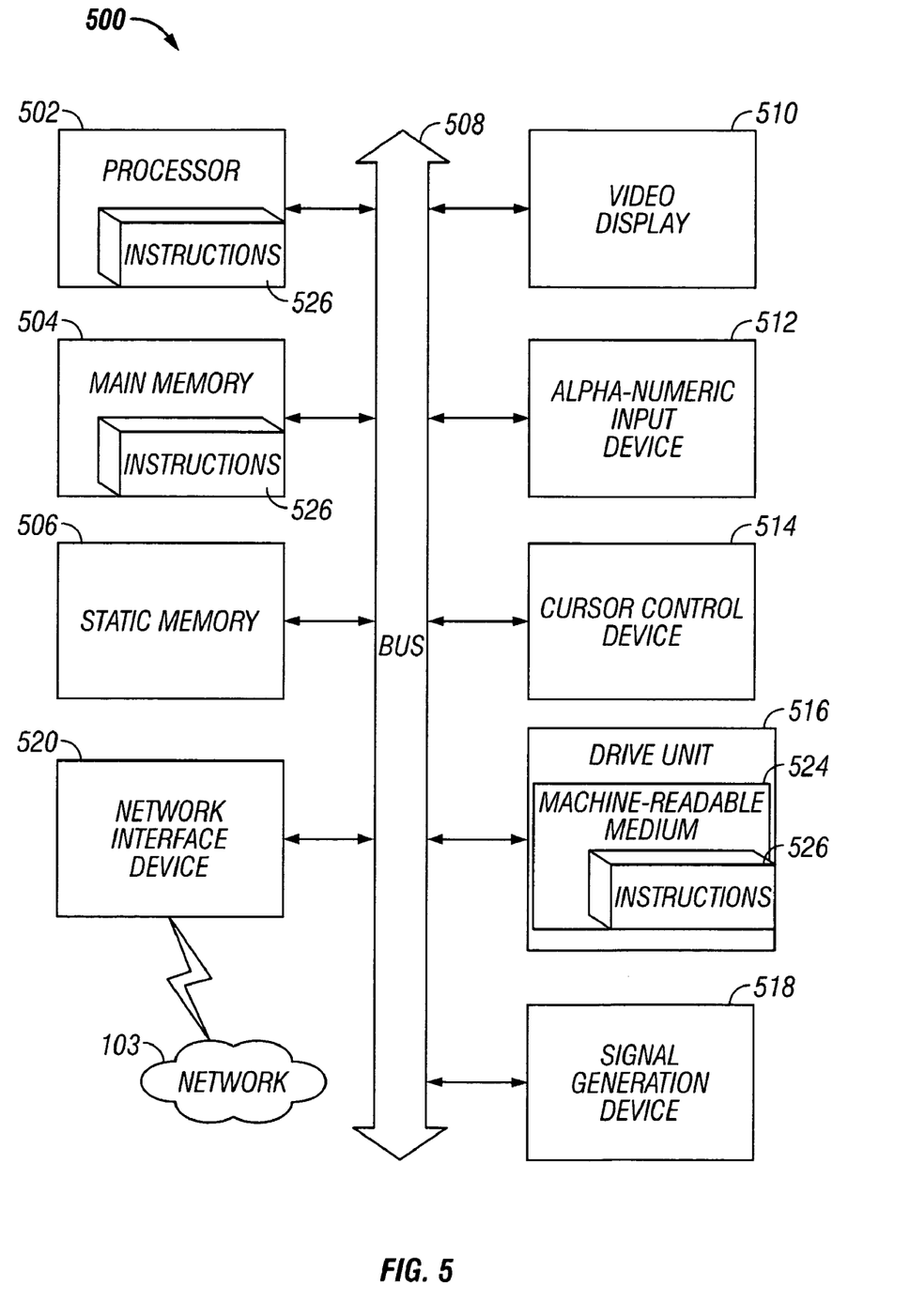
FIG. 5 is a diagrammatic representation of a machine in the exemplary form of a computer system within which a set of instructions may be executed.

FIG. 5 shows a diagrammatic representation of a machine in the exemplary form of a computer system 500 within which a set of instructions may be executed to cause the machine to perform any one of the methodologies discussed above. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510, e.g. a liquid crystal display (LCD) or a cathode ray tube (CRT). The computer system 500 also includes an alphanumeric input device 512, e.g, a keyboard, a cursor control device 514, e.g. a mouse, a disk drive unit 516, a signal generation device 518, e.g. a speaker, and a network interface device 520.

The disk drive unit 516 includes a machine-readable medium 524 on which is stored a set of instructions, i.e. software, 526 embodying any one, or all, of the methodologies described above. The software 526 is also shown to reside, completely or at least partially, within the main memory 504 and/or within the processor 502. The software 526 may further be transmitted or received via the network interface device 520.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method provided across a network, comprising the steps of:

receiving at a location registrar entity a location identifier and a user identifier sent from a communications device across said network, said location identifier corresponding to said communications device, and said user identifier associated with a user;

retrieving a user profile associated with said user identifier received at said location registrar entity, said user profile comprising at least one stored location identifier;

accepting a location corresponding to said location identifier received at said location registrar entity as a current location of said communications device if said location identifier received at said location registrar entity matches one of said stored location; and receiving location information from said user if said received location identifier fails to match one of said stored location identifiers, comprising the steps of receiving said location information by any of directing said user to a network operator to provide said location information, receiving said location information verbally from said user, and receiving electronically input location information from said user, and upon receipt, storing said location information with said location identifier and said user identifier received at said location registrar entity in said user profile, said location information being stored as current location information.

2. The method of claim 1, wherein said network comprises any of a voice packet network system (VOPS), a Voice over Internet Protocol (VoIP) enabled network, and the Internet.

3. The method of claim 2, wherein said voice packet network system (VOPS) comprises any of a voice over frame relay network system, a voice over Asynchronous Transfer Mode (ATM) network system, and a Voice over High-Level Data Link Control (HLDC) network system.

4. The method of claim 1, wherein said network operates in accordance with any of Voice over Internet Protocol (VoIP) and Session Initiation Protocol (SIP).

5. The method of claim 1, wherein said accepted location of said communications device is accepted as a current location of said user.

6. The method of claim 1, wherein said communications device comprises a Session Initiation Protocol (SIP) device.

7. The method of claim 1, further comprising the step of:

presenting a network readiness signal to said user if said location identifier received at said location registrar entity matches one of said stored location identifiers.

8. The method of claim 7, further comprising the steps of:

receiving a destination user identifier associated with a destination user for communication in said network; and using said destination user identifier to establish communication with said destination user.

9. The method of claim 1, further comprising the step of:

updating stored location information as current location information if said location identifier received at said location registrar entity matches one of said stored location identifiers, said stored location information being associated with a matched location identifier of one of said stored location identifiers.

10. The method of claim 1, wherein said location identifier received at said location registrar entity comprises an Internet Protocol (IP) address.

11. The method of claim 1, wherein said user identifier comprises a Session Initiation Protocol (SIP) contact address of record associated with said user.

12. The method of claim 1, wherein at least one of said stored location identifiers comprises a prior location identifier associated with said user.

13. A method provided across a network, comprising the steps of:
- receiving at a location registration registrar entity a location identifier and a user identifier sent from a communications device across said network, said location identifier corresponding to said communications device, and said user identifier associated with a user;
- retrieving a user profile associated with said user identifier received at said location registrar entity, said user profile comprising at least one stored location identifier;
- accepting a location corresponding to said location identifier received at said location registrar entity as a current location of said communications device if said location identifier received at said location registrar entity matches one of said stored location identifiers;
- determining location information of said user if said location identifier received at said location registrar entity fails to match one of said stored location identifiers, wherein said determining step further comprises the steps of
  - connecting to a gateway device having knowledge of said user, and
  - extracting said location information of said user from said gateway device; and
- storing said location information with said location identifier and said user identifier received at said location registrar entity in said user profile, said location information being stored as current location information.

14. The method of claim 13, wherein said determining step further comprises the step of:
- using a network Global Positioning System (GPS) to retrieve said location information of said user.

15. A system for providing current location services in a network, comprising:
- a location registrar entity for receiving from a communications device across said network a location identifier corresponding to said communications device, and a user identifier associated with a user;
- means for retrieving a user profile associated with said user identifier received at said location registrar entity, said user profile comprising at least one stored location identifier;
- means for accepting a location corresponding to said location identifier received at said location registrar entity as a current location of said communications device if said location identifier received at said location registrar entity matches one of said stored location identifiers; and
- means for receiving location information from said user if said location identifier received at said location registrar entity fails to match one of said stored location identifiers, wherein said receiving means further comprises
  - means for receiving said location information comprising any of
    - means for directing said user to a network operator to provide said location information,
    - means for receiving location information verbally from said user, and
    - means for receiving electronically input location information from said user, and
  - means for storing said location information upon receipt thereof with said location identifier and said user identifier received at said location registrar entity in said user profile, said location information being stored as current location information.

16. The system of claim 15, wherein said network comprises any of a voice packet network system (VOPS), a Voice over Internet Protocol (VoIP) enabled network, and the Internet.

17. The system of claim 16, wherein said voice packet network system (VOPS) comprises any of a voice over frame relay network system, a voice over Asynchronous Transfer Mode (ATM) network system, and a Voice over High-Level Data Link Control (HLDC) network system.

18. The system of claim 15, wherein said network operates in accordance with any of Voice over Internet Protocol (VoIP) and Session Initiation Protocol (SIP).

19. The system of claim 15, wherein said accepted location of the communications device is accepted as a current location of said user.

20. The system of claim 15, wherein said communications device comprises a Session Initiation Protocol (SIP) device.

21. The system of claim 15, further comprising:
- means for presenting a network readiness signal to said user if said location identifier received at said location registrar entity matches one of said stored location identifiers.

22. The system of claim 21, further comprising:
- means for receiving a destination user identifier associated with a destination user for communication in said network; and
- means for using said destination user identifier to establish communication with said destination user.

23. The system of claim 15, further comprising:
- means for updating stored location information as current location information if said location identifier received at said location registrar entity matches one of said stored location identifiers, said stored location information being associated with a matched location identifier of one of said stored location identifiers.

24. The system of claim 15, wherein said location identifier received at said location registrar entity comprises an Internet Protocol (IP) address.

25. The system of claim 15, wherein said user identifier comprises a Session Initiation Protocol (SIP) contact address of record associated with said user.

26. The system of claim 15, wherein at least one of said stored location identifiers comprises a prior location identifier associated with said user.

27. A system for providing current location services in a network, comprising:
- a location registrar entity for receiving from a communications device across said network a location identifier corresponding to said communications device, and a user identifier associated with a user;
- means for retrieving a user profile associated with said user identifier received at said location registrar entity, said user profile comprising at least one stored location identifier; and
- means for accepting a location corresponding to said location identifier received at said location registrar entity as a current location of said communications device if said location identifier received at said location registrar entity matches one of said stored location identifiers;
- means for determining location information of said user if said location identifier received at said location registrar entity fails to match one of said stored location identifiers, wherein said determining means comprises
  - means for connecting to a gateway device having knowledge of said user, and means for extracting said location information of said user from said gateway device; and
means for storing said location information with said location identifier and said user identifier received at said location registrar entity in said user profile, said location information being stored as current location information.

28. The system of claim 27, wherein said determining means further comprises
means for using a network Global Positioning System (GPS) to retrieve said location information of said user.

29. A method provided across a network, comprising the steps of:
receiving from a communications device across said network a location identifier corresponding to said communications device, and a user identifier associated with a user;
retrieving a user profile associated with said user identifier, said user profile comprising at least one stored location identifier;
accepting a location corresponding to said received location identifier as a current location of said communications device if said received location identifier matches one of said stored location identifiers; and
receiving location information from said user if said received location identifier fails to match one of said stored location identifiers, comprising the steps of
receiving said location information by any of
directing said user to a network operator to provide said location information,
receiving said location information verbally from said user, and
receiving electronically input location information from said user, and
upon receipt, storing said location information with said received location identifier and said user identifier in said user profile, said location information being stored as current location information.

30. A method provided across a network, comprising the steps of:
receiving from a communications device across said network a location identifier corresponding to said communications device, and a user identifier associated with a user;
retrieving a user profile associated with said user identifier, said user profile comprising at least one stored location identifier;
accepting a location corresponding to said received location identifier as a current location of said communications device if said received location identifier matches one of said stored location identifiers;
determining location information of said user if said received location identifier fails to match one of said stored location identifiers, wherein said determining step further comprises the steps of
connecting to a gateway device having knowledge of said user, and
extracting said location information of said user from said gateway device; and
storing said location information with said received location identifier and said user identifier in said user profile, said location information being stored as current location information.

31. A system for providing current location services in a network, comprising:
means for receiving from a communications device across said network a location identifier corresponding to said communications device, and a user identifier associated with a user;
means for retrieving a user profile associated with said user identifier, said user profile comprising at least one stored location identifier;
means for accepting a location corresponding to said received location identifier as a current location of said communications device if said received location identifier matches one of said stored location identifiers; and
means for receiving location information from said user if said received location identifier fails to match one of said stored location identifiers, wherein said receiving means further comprises
means for receiving said location information comprising any of
means for directing said user to a network operator to provide said location information,
means for receiving location information verbally from said user, and
means for receiving electronically input location information from said user, and
means for storing said location information upon receipt thereof with said received location identifier and said user identifier in said user profile, said location information being stored as current location information.

32. A system for providing current location services in a network, comprising:
means for receiving from a communications device across said network a location identifier corresponding to said communications device, and a user identifier associated with a user;
means for retrieving a user profile associated with said user identifier, said user profile comprising at least one stored location identifier;
means for accepting a location corresponding to said received location identifier as a current location of said communications device if said received location identifier matches one of said stored location identifiers;
means for determining location information of said user if said received location identifier fails to match one of said stored location identifiers, wherein said determining means comprises
means for connecting to a gateway device having knowledge of said user, and
means for extracting said location information of said user from said gateway device; and
means for storing said location information with said received location identifier and said user identifier in said user profile, said location information being stored as current location information.

* * * * *